(12) United States Patent
Oreyang

(10) Patent No.: US 9,079,598 B1
(45) Date of Patent: Jul. 14, 2015

(54) FOLDABLE TROLLEY

(71) Applicant: ACROX TECHNOLOGIES CO., LTD., Taipei (TW)

(72) Inventor: Yia-Yuan Oreyang, Taipei (TW)

(73) Assignee: Acrox Technologies Co., Ltd., Taipei (TW)

( * ) Notice: Subject to any disclaimer, the term of this patent is extended or adjusted under 35 U.S.C. 154(b) by 0 days.

(21) Appl. No.: 14/300,237

(22) Filed: Jun. 10, 2014

(51) Int. Cl.
 *B62B 3/02* (2006.01)

(52) U.S. Cl.
 CPC ...................................... *B62B 3/022* (2013.01)

(58) Field of Classification Search
 CPC .............. B62B 3/022; B62B 2202/404; B62B 2202/406; A63B 55/08; A63B 55/087; A63B 2055/088
 USPC ................. 280/642, 647, 651, 47.26, DIG. 5, 280/DIG. 6; 206/315.3
 See application file for complete search history.

(56) References Cited

U.S. PATENT DOCUMENTS

| | | | | |
|---|---|---|---|---|
| 7,862,053 B2 * | 1/2011 | Liao | ............................ | 280/47.34 |
| 7,866,685 B2 * | 1/2011 | Liao | ............................ | 280/651 |
| 8,282,121 B2 * | 10/2012 | Lin | ............................ | 280/651 |
| 8,292,321 B2 * | 10/2012 | Liao | ............................ | 280/652 |
| 8,393,633 B2 * | 3/2013 | Liao | ............................ | 280/651 |
| 8,403,355 B2 * | 3/2013 | Liao | ............................ | 280/651 |
| 8,500,153 B2 * | 8/2013 | Liao | ............................ | 280/651 |
| 8,720,912 B2 * | 5/2014 | Liao | ............................ | 280/47.26 |
| 2008/0211206 A1 * | 9/2008 | Thorne et al. | ............... | 280/650 |
| 2009/0295130 A1 * | 12/2009 | Liao | ............................ | 280/651 |
| 2010/0052275 A1 * | 3/2010 | Reimers et al. | ............ | 280/47.26 |
| 2010/0059948 A1 * | 3/2010 | Liao | ............................ | 280/42 |
| 2010/0090443 A1 * | 4/2010 | Liao | ............................ | 280/651 |
| 2011/0241314 A1 * | 10/2011 | Liao | ............................ | 280/651 |
| 2011/0316258 A1 * | 12/2011 | Lin | ............................ | 280/651 |
| 2012/0112436 A1 * | 5/2012 | Liao | ............................ | 280/651 |
| 2012/0261908 A1 * | 10/2012 | Liao | ............................ | 280/651 |
| 2013/0093165 A1 * | 4/2013 | Liao | ............................ | 280/651 |
| 2014/0159348 A1 * | 6/2014 | Wu | ............................ | 280/651 |

* cited by examiner

*Primary Examiner* — Hau Phan
*Assistant Examiner* — Jacob Meyer
(74) *Attorney, Agent, or Firm* — Leong C. Lei

(57) ABSTRACT

A foldable trolley includes a chassis frame, which includes a front wheel set and a rear wheel set between a slidable plate is arranged for driving the rear wheel set to collapse toward the front wheel set. The first frame is coupled to a first driver device and is mounted on the slidable plate. The second frame is coupled to a second driver device and connected to the first frame. The first driver device drives the first frame to bend toward the front wheel set and the first frame drives the slidable plate to move simultaneously so as to have the rear wheel set to collapse towards the front wheel set. The second driver device drives the second frame to bend toward the rear wheel set so as to achieve an effect of multiple-stage folding to effectively reduce the overall size after folding.

6 Claims, 9 Drawing Sheets

FOLDABLE TROLLEY

TECHNICAL FIELD OF THE INVENTION

The present invention generally relates to a foldable trolley, and more particularly to a foldable trolley, in which when a first driver device is operated to rotate and thus bend a first frame, the first frame drives a rear wheel set of a chassis frame to collapse toward a front wheel set and a second driver device is operated to rotate and thus bend a second frame so that the first and second frames are caused to fold toward each other and positioned in an overlapping manner on the chassis frame and the rear wheel set of the chassis frame is collapsed toward the front wheel set to reduce the distance between two wheels of the rear wheel set and the distance between the rear wheel set and the front wheel set to achieve an effect of multiple-stage folding and reduce the overall size after folding.

DESCRIPTION OF THE PRIOR ART

With the increasing desire in improving living quality and health, together with the new trend of change of living styles, people are getting more and more concerned about leisure activities. For example, golf is one of the prevailing leisure and exercising activities that people are more willing to choose nowadays.

To play a game of golf, players often individually carry a number of golf clubs for different purposes. These clubs must be collectively placed in a golf bag for easy carrying and storage. This, however, makes the golf bag very heavy.

Due to such a reason, most of the people playing golf hire additional workers to carry the golf bags. These workers require extra payment, which is often expensive.

With the development of science and technology, movable carrying device that help carry and transport articles and cargos have been already available. Combination of the carrying device with the golf bag would be advantageous in enabling a golf player to easily carry and move the golf bag individually and is also helpful in saving the cost that the player would have to pay to the golf bag carrying workers.

However, the carrying devices that are currently available in the market do not allow for fast collapse and expansion so that the known carrying devices are generally bulky, making them difficult to carry and store, thereby imposing limitations to the range of application of the known carrying device. For such reasons, the known carrying devices are not generally accepted by the general consumers.

Concerning applications, the present invention provides a trolley that is applicable as a cargo cart and a baby carriage, which based on the function of collapsibility and expandability achieved with the present invention provides advantages in respect of carrying and storage and thus a great power of market competition.

SUMMARY OF THE INVENTION

The primary object of the present invention is to disclose a foldable trolley, which comprises a chassis frame, a first frame, and a second frame. The chassis frame comprises a front wheel set, a slidable plate, and a rear wheel set. The front wheel set comprises a shaft. The slidable plate is fit over the shaft and is linearly movable. The rear wheel set is pivotally connected to the slidable plate so that the rear wheel set is in operative and synchronously movable coupling with the slidable plate. The slidable plate comprises a first driver device mounted thereon. The first frame is coupled to the first driver device and the first frame is mounted on the chassis frame so that the first driver device selectively drives the first frame to rotate and thus bend in a direction toward the front wheel set. The second frame is coupled to a second driver device and is connected to the first frame so that the second driver device selectively drives the second frame to rotate and thus bend in a direction toward the rear wheel set. As such, when the first driver device drives the first frame to bend in the direction toward the front wheel set, the first frame simultaneously drives the slidable plate to linearly move toward the front wheel set so that the rear wheel set is collapsed toward the front wheel set. The second driver device may drive the second frame to bend in the direction toward the rear wheel set so as to achieve automatic and fast multiple-stage collapse and expansion, which effectively reduce the overall size after folding and allows for fast expansion for use.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
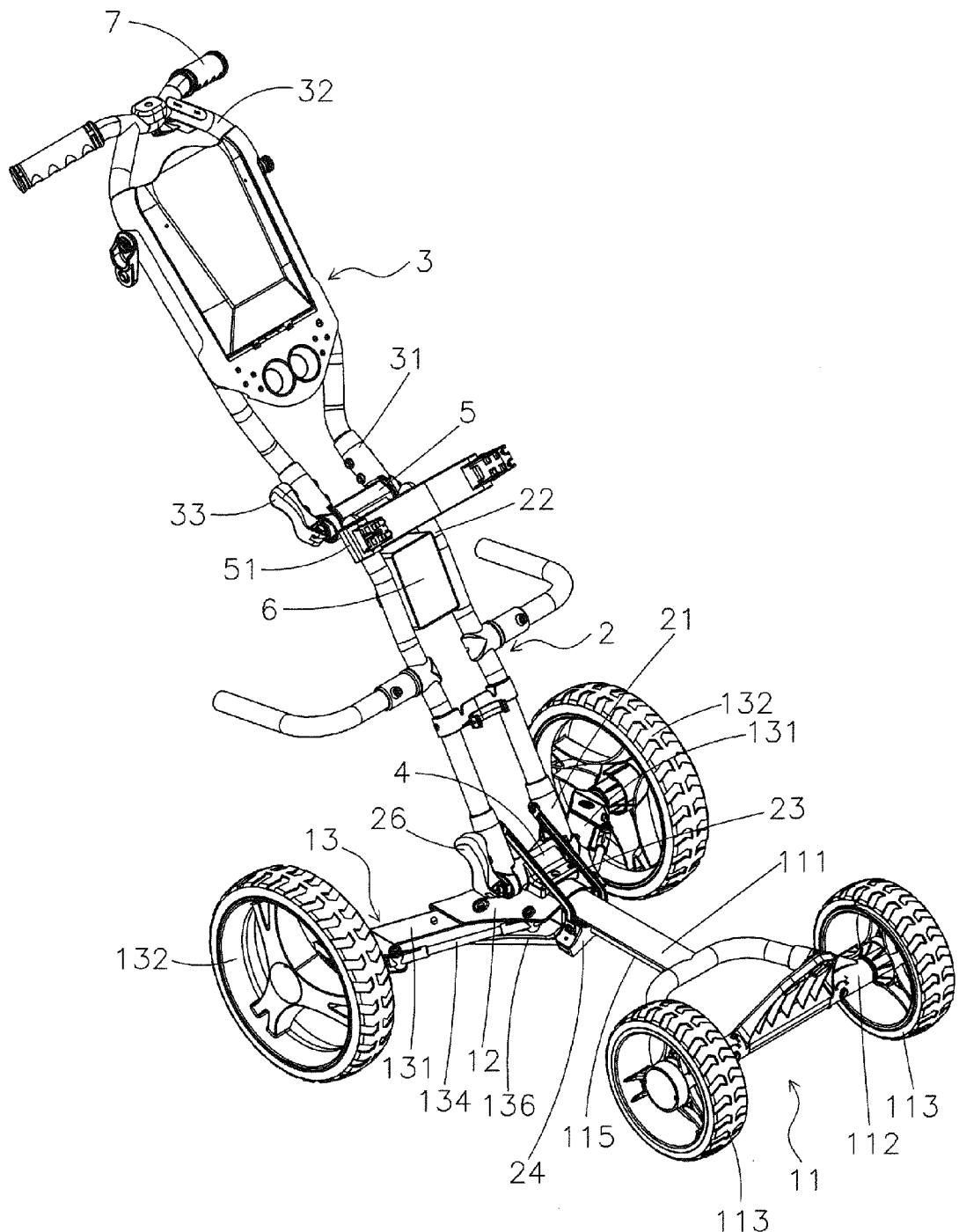
FIG. 1 is a perspective view showing a foldable trolley according the present invention in an expanded condition.
Figure 2:
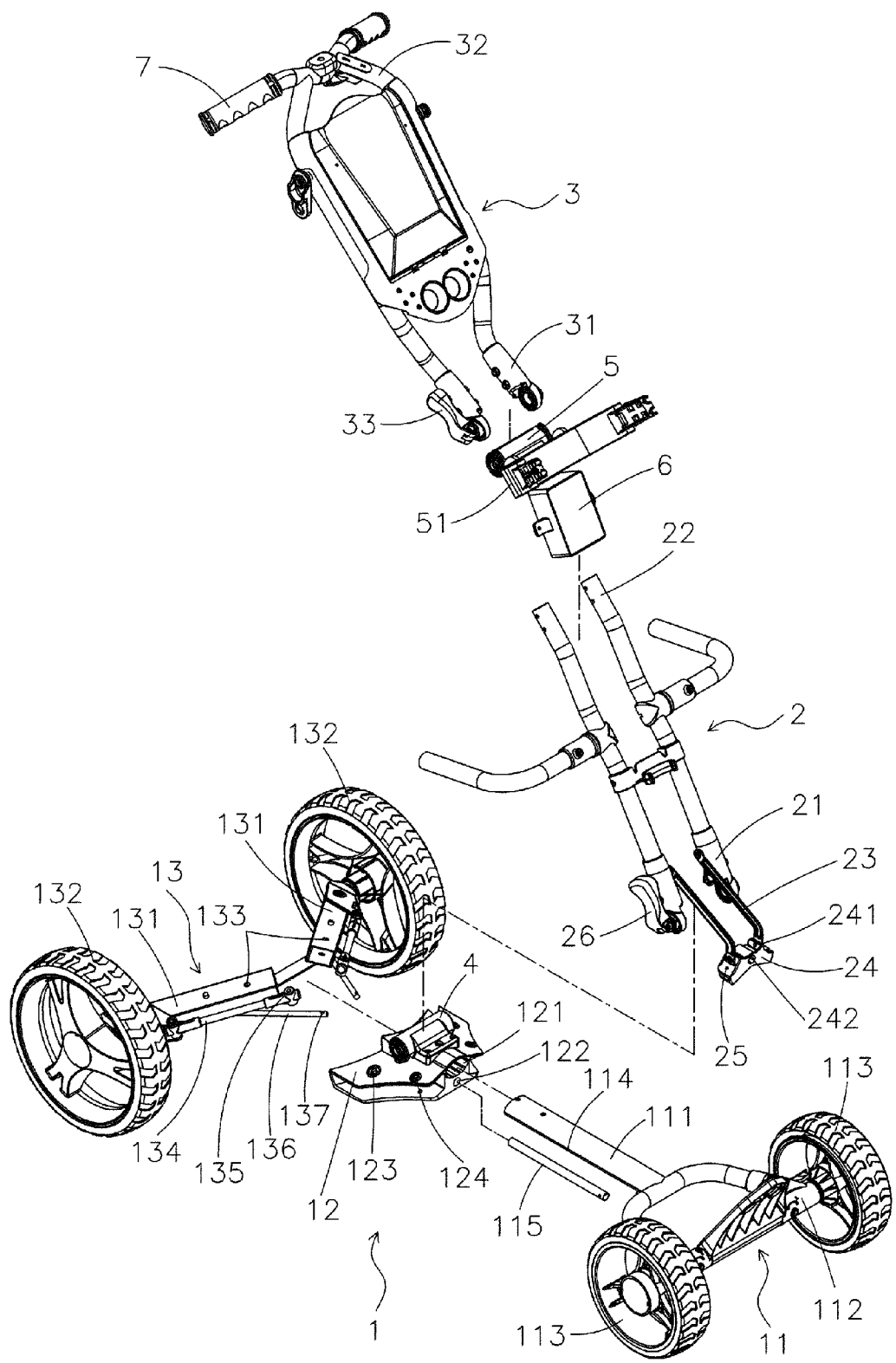
FIG. 2 is an exploded view of the foldable trolley of the present invention.
Figure 3:
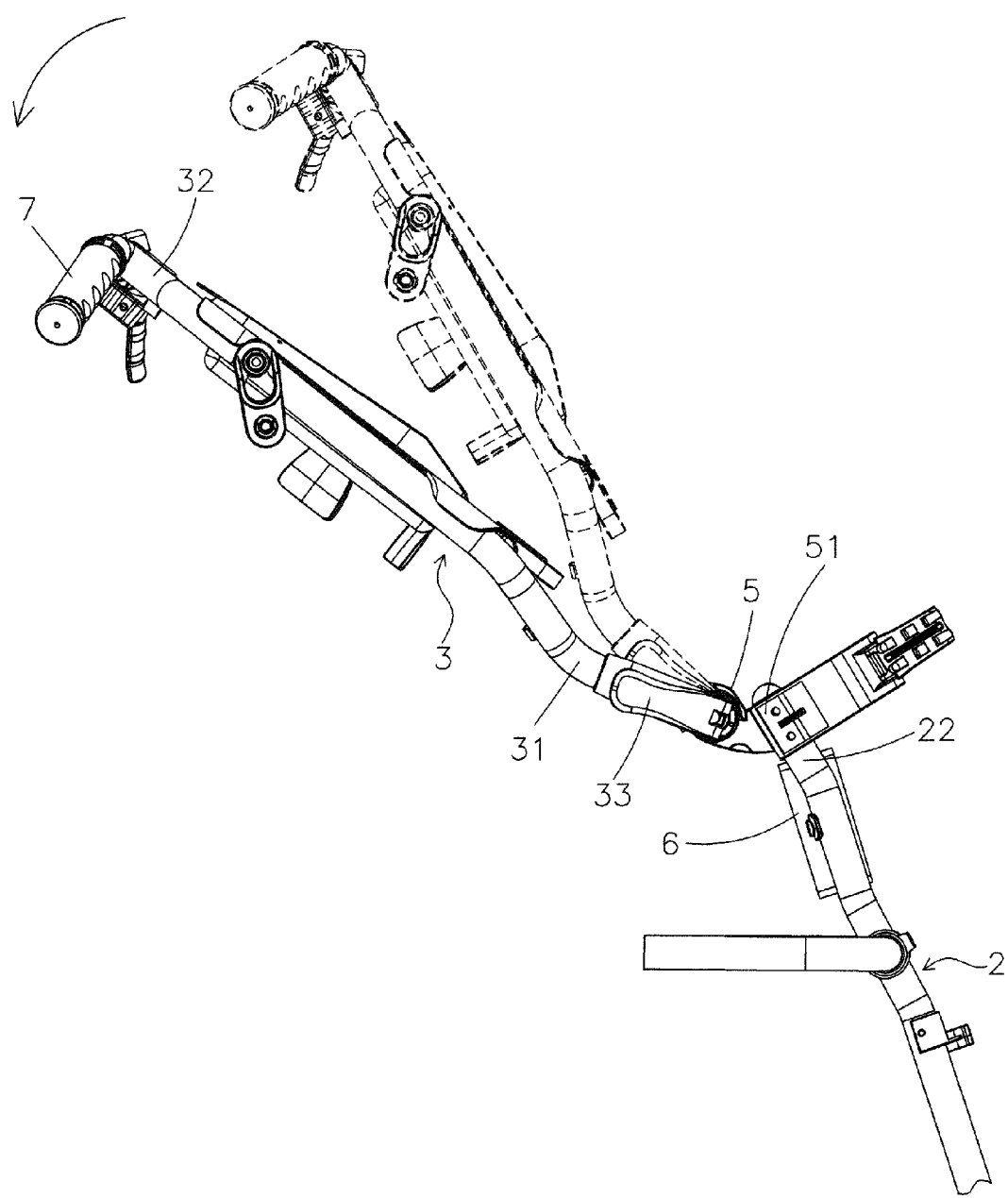
FIG. 3 is a perspective view illustrating an operation of first and second frames of the foldable trolley of the present invention.
Figure 4:
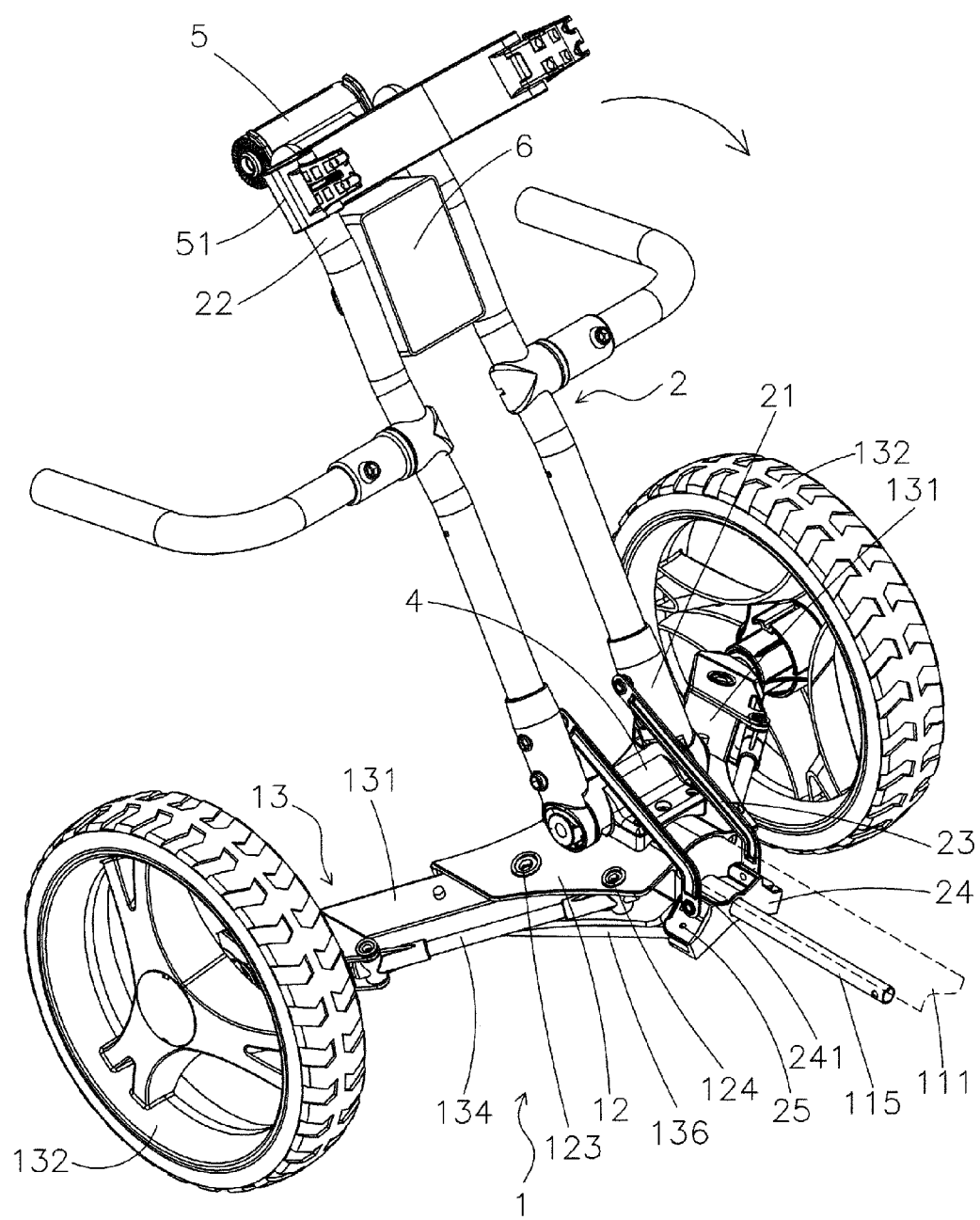
FIG. 4 is a perspective view illustrating an operation of the first frame of the foldable trolley of the present invention.
Figure 5:
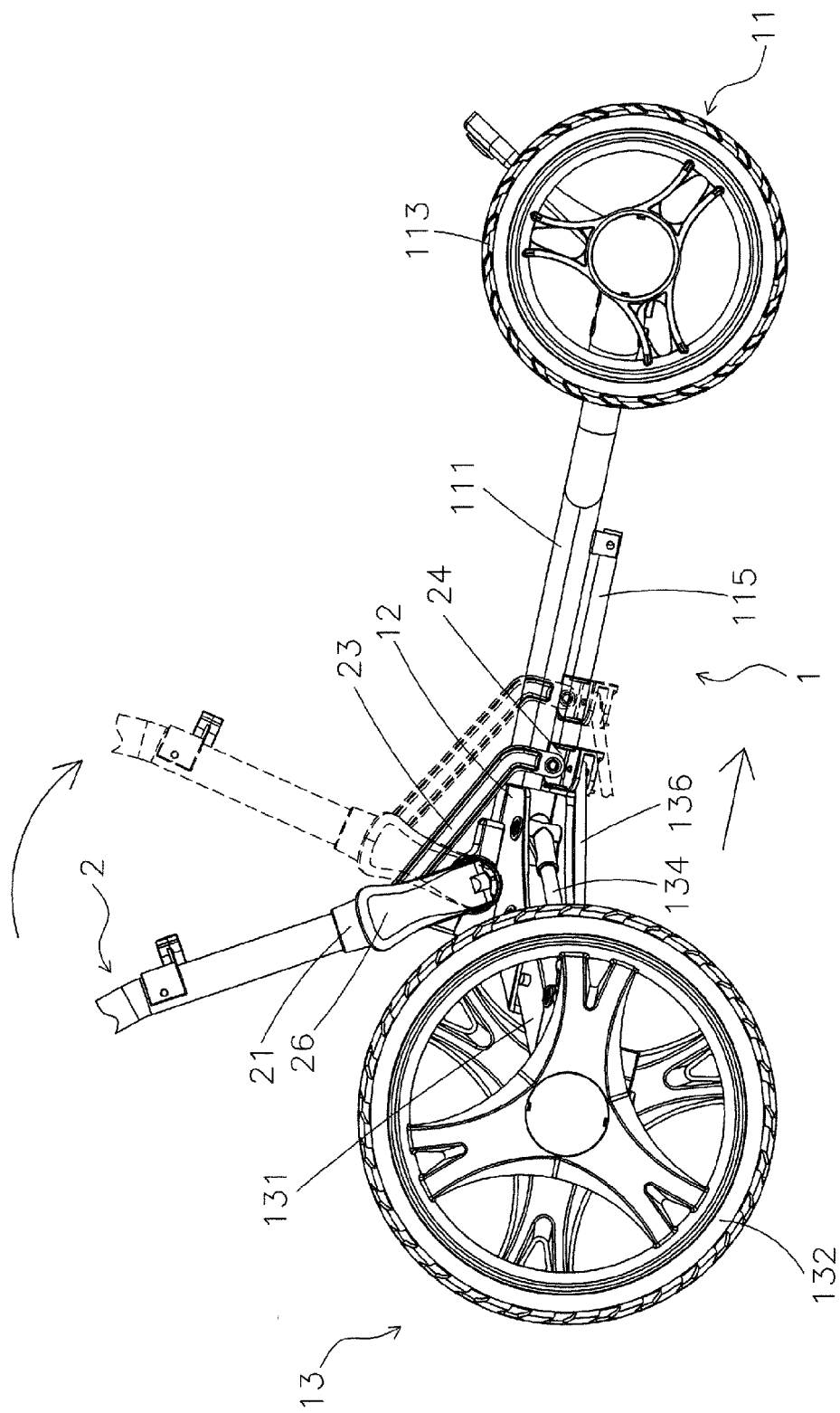
FIG. 5 is a side elevational view illustrating the operation of the first frame of the foldable trolley of the present invention.
Figure 6:
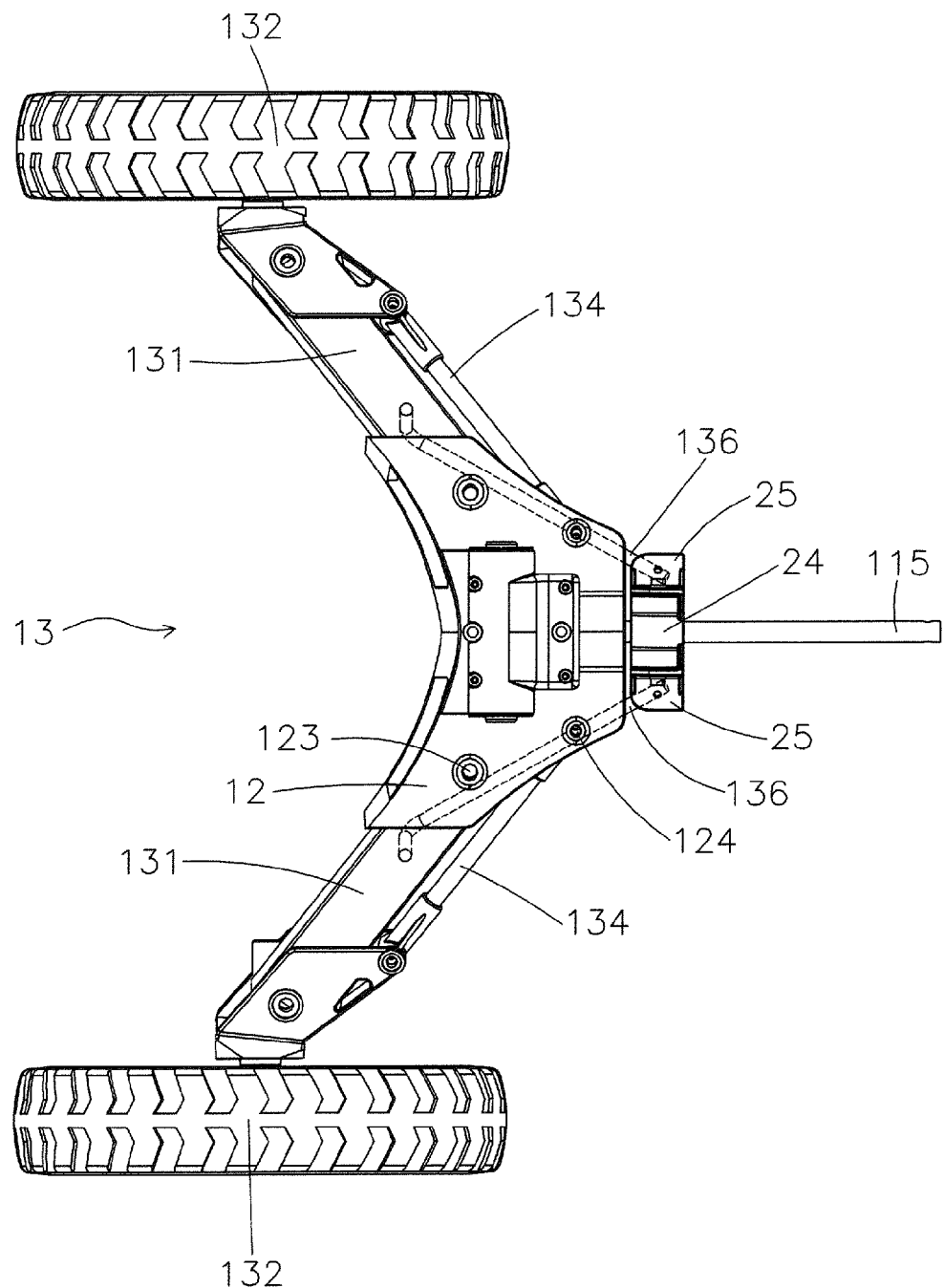
FIG. 6 is a top plan view showing a chassis frame of the foldable trolley of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-9, the present invention discloses a foldable trolley, which comprises a chassis frame 1, a first frame 2, and a second frame 3.

The chassis frame 1 comprises a front wheel set 11, a slidable plate 12, and a rear wheel set 13. The front wheel set 11 comprises a shaft 111. The shaft 111 has an end to which a first axle 112 is mounted. The first axle 112 comprises two front wheels 113 mounted thereto. The shaft 111 comprises a slide rail 114 formed on each of two opposite sides thereof. The shaft 111 is further connected to a positioning bar 115. The positioning bar 115 can be arranged under the shaft 111 or set at other locations. The slidable plate 12 is fit over the shaft 111 to be linearly movable along the shaft 111. The slidable plate 12 comprises a first through hole 121 and a second through hole 122 formed therein. The first through hole 121 is fit over the shaft 111 and the second through hole 122 is fit over the positioning bar 115. The slidable plate 12 comprises a first pivotal joint section 123 and a second pivotal joint section 124 formed on each of two opposite side portions thereof. The slidable plate 12 comprises a first driver device 4 mounted thereon. The rear wheel set 13 comprises two second axles 131. Each of the second axles 131 has an end to which a rear wheel 132 is mounted and an opposite end in which a third pivotal joint section 133 is formed. The second axles 131 are each additionally and pivotally connected to a first link 134 and a second link 136. The first link 134 has a free end in which a fourth pivotal joint section 135 is formed. The second link 136 has a free end in which a fifth pivotal joint section 137 is formed. The third pivotal joint sections 133 of the second axles 131 are respectively and pivotally connected to the first pivotal joint sections 123 of the slidable plate 12 and the fourth pivotal joint sections 135 of the first links 134 are respectively and pivotally connected to the second pivotal joint sections 124 of the slidable plate 12 so that the two second axles 131 and the two first link 134 of the rear wheel set 13 are in operative and synchronously movable coupling with the slidable plate 12.

The first frame 2 is mounted on the chassis frame 1. The first frame 2 has an end forming a first connection end 21 and an opposite end forming a second connection end 22. The second connection end 22 is coupled to the first driver device 4 so that the first driver device 4 selectively drives the first frame 2 to rotate. For example, the first driver device 4 drives the first frame 2 to rotate and thus bend in a direction toward the front wheel set 11 of the chassis frame 1. The first frame 2 comprises a third link 23 pivotally connected thereto at a location adjacent to the first connection end 21. The third link 23 has a free end to which a slide block 24 is pivotally connected. The slide block 24 comprises an engaging section 241 and a third through hole 242 formed thereon. The slide block 24 comprises a sixth pivotal joint section 25 formed in each of two opposite side portions thereof. The engaging section 241 of the slide block 24 is engageable with the slide rails 114 of the shaft 111 with the third through hole 242 of the slide block 24 slidably fit over the positioning bar 115 of the front wheel set 11, whereby the slide block 24 is linearly movable along the shaft 111. The sixth pivotal joint sections 25 of the slide block 24 are respectively and pivotally connected to the fifth pivotal joint sections 137 of the second links 136 of the rear wheel set 13 so that the second links 136 of the rear wheel set 13 are in operative and synchronously movable coupling with the slide block 24.

The second frame 3 is connected to the first frame 2 and is located above the first frame 2. The second frame 3 has an end forming a third connection end 31 and an opposite end forming a fourth connection end 32. The third connection end 31 is coupled to a second driver device 5, so that the second driver device 5 selectively drives the second frame 3 to rotate. For example, the second driver device 5 drives the second frame 3 to rotate and thus bend in a direction toward the rear wheel set 113 of the chassis frame 1. The second driver device 5 comprises a coupling section 51. The coupling section 51 of the second driver device 5 is coupled to the second connection end 22 of the first frame 2 so that the second frame 3 and the first frame 2 are connected to each other. Further, the second frame 3 comprises a handlebar 7 mounted to the fourth connection end 32 thereof.

The present invention further comprises a control device 6. The control device 6 is mounted on one of the chassis frame 1, the first frame 2, and the second frame 3. For example, the control device 6 can be mounted to the second frame 3. The control device 6 comprises at least one battery module. The control device 6 is electrically connected to the first driver device 4 and the second driver device 5, so that the control device 6 controls the first driver device 4 and the second driver device 5 to rotate forward or backward.

Figure 7:
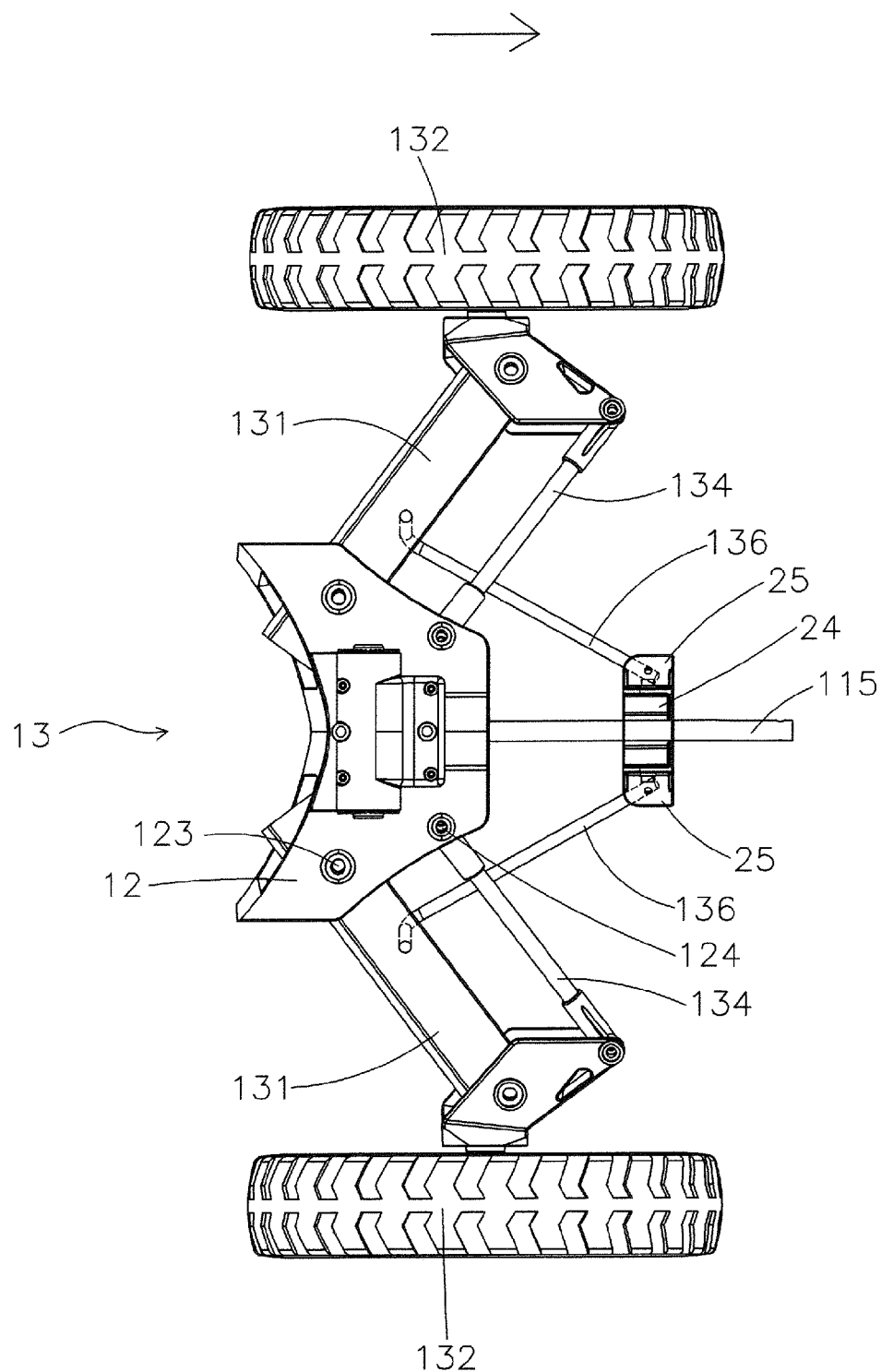
FIG. 7 is a top plan view illustrating an operation of the chassis frame of the foldable trolley of the present invention.
Figure 8:
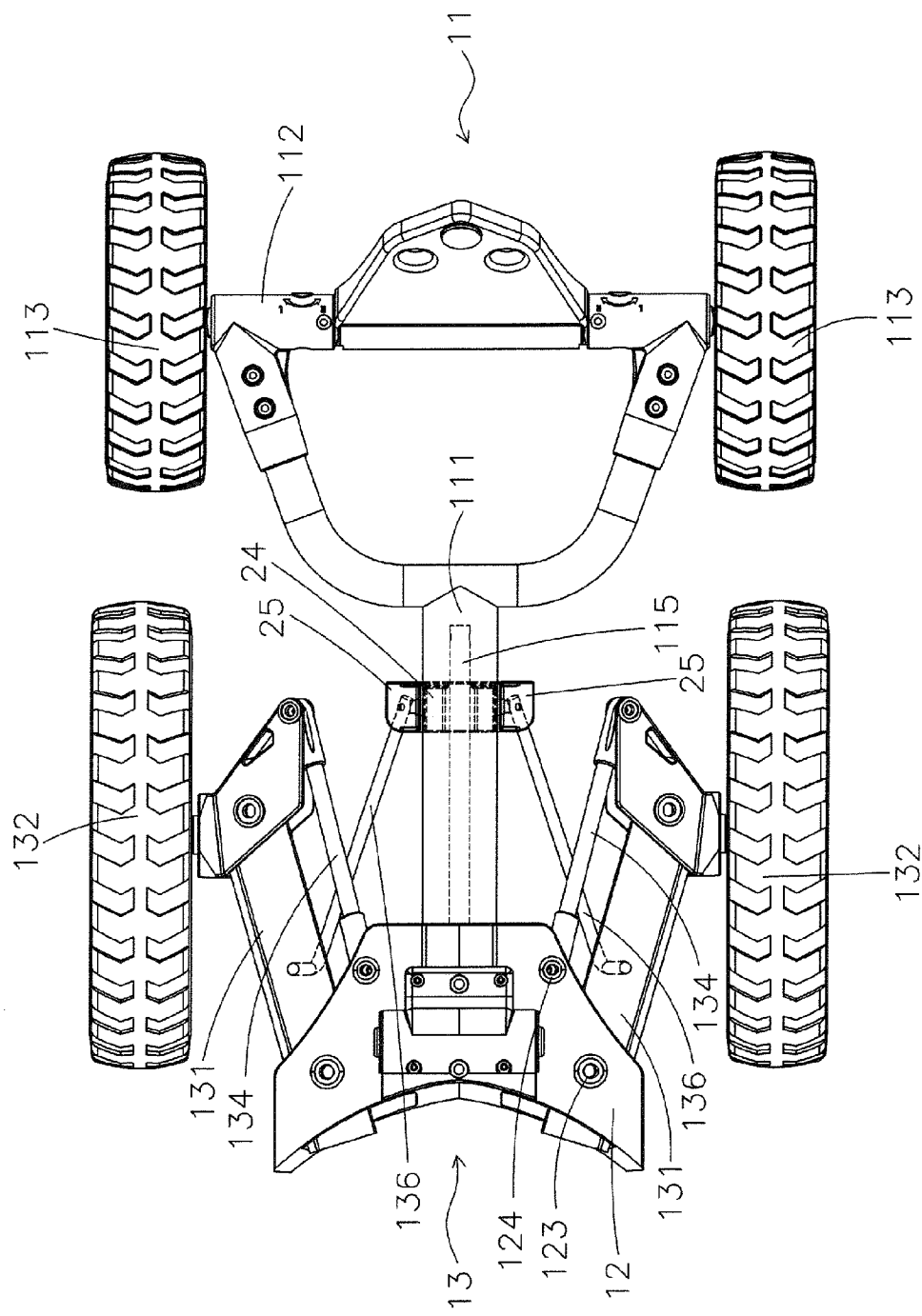
FIG. 8 is a top plan view illustrating collapse of the chassis frame of the foldable trolley of the present invention.
Figure 9:
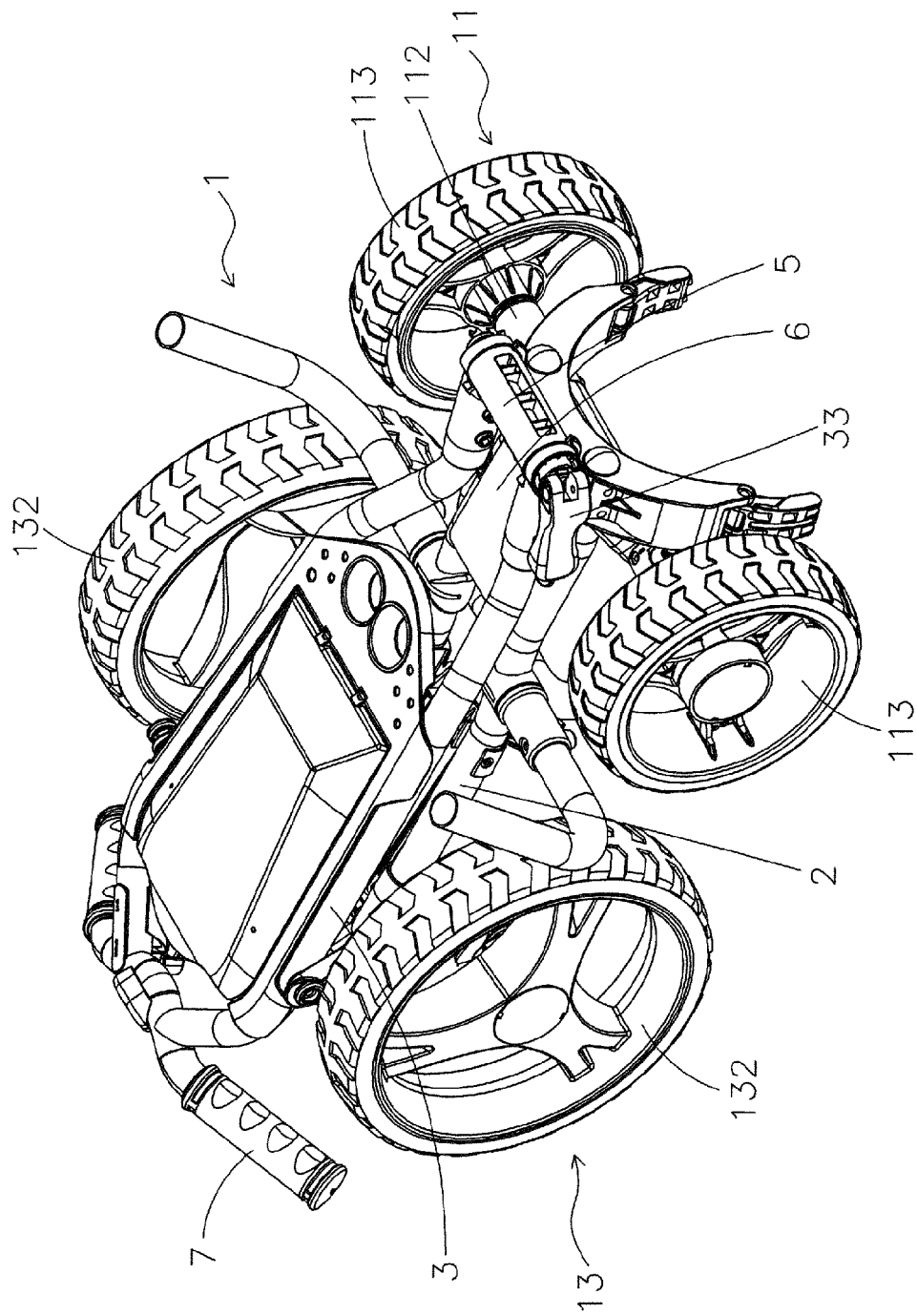
FIG. 9 is a perspective view showing the foldable trolley of the present invention in a folded condition.

To fold the foldable trolley, the first driver device 4 is operated to drive the first frame 2 to bend in the direction toward the front wheel set 11 of the chassis frame 1. The third link 23 of the first frame 2 drives the slide block 24 to move frontward and the slide block 24 drive the second links 136 of the rear wheel set 13 to move synchronously so as to cause the slidable plate 12 to synchronously move frontward. The slidable plate 12 drive the second axles 131 and the first links 134 of the rear wheel set 13 to move in unison therewith so that the rear wheel set 13 of the chassis frame 1 is caused to collapse toward the front wheel set 11 (as shown in FIGS. 7 and 8) to thereby reduce the distance between the two wheels 132 of the rear wheel set 13 and the distance between the rear wheel set 13 and the front wheel set 11. Further, the second driver device 5 is operated to drive the second frame 3 to bend toward the rear wheel set 13 of the chassis frame 1 so that the second frame 3 is folded and positioned on the first frame 2 (as shown in FIG. 9). As such, an effect of multiple-stage folding is achieved to effectively reduce the overall size after folding, allowing for easy carrying and storage by a user.

To expand the foldable trolley, the first driver device 4 is operated to move in an opposite directly so as to drive the first frame 2 to lift upward in a direction toward the rear wheel set 13 of the chassis frame 1. The third link 23 of the first frame 2 drives the slide block 24 to move rearward and the slide block 24 drives the second links 136 of the rear wheel set 13 to move in unison therewith thereby causing the slidable plate 12 to simultaneously move rearward. The slidable plate 12 drives the second axles 131 and the first links 134 of the rear wheel set 13 to move in unison therewith so that the rear wheel set 13 of the chassis frame 1 is caused to expand in a direction toward the rear side. Further, the second driver device 5 is operated to move in an opposite direction to drive the second frame 3 to lift upward in a direction toward the front wheel set 11 of the chassis frame 1 so that the second frame 3 is lifted to locate above the first frame 2 (as shown in FIG. 1), thereby completing the expansion of the foldable trolley.

The first connection end 21 of the first frame 2 and the first driver device 4 are provided with gears at the coupling engagement therebetween so that the first driver device 4 may drive the first frame 2 to rotate. The first frame 2 is provided with a first latch 26 at the site where the first connection end 21 and the first driver device 4 are in coupling engagement with each other so that when the first latch 26 is secured, a tight gear engagement is formed between the first connection end 21 of the first frame 2 and the first driver device 4; and when the first latch 26 is released, the gear engagement between the first connection end 21 of the first frame 2 and the first driver device 4 is released.

The third connection end 31 of the second frame 3 and the second driver device 5 are provided with gears at the coupling engagement therebetween so that the second driver device 5 may drive the second frame 3 to rotate. The second frame 3 is provided with a second latch 33 at the site where the third connection end 31 and the second driver device 5 are in coupling engagement with each other so that when the second latch 33 is secured, a tight gear engagement is formed between the third connection end 31 of the second frame 3 and the second driver device 5; and when the second latch 33 is released, the gear engagement between the third connection end 31 of the second frame 3 and the second driver device 5 is released.

As such, through releasing the first latch 26 and the second latch 33, the first frame 2 and the second frame 3 are allowed to manually operated for folding and collapsing, whereby a similar effect of multiple-stage folding can be achieved to similarly reduce the overall size after collapse.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A foldable trolley, comprising:
   a chassis frame, which comprises:
      a front wheel set, which comprises a shaft, the shaft having an end to which a first axle is mounted, the first axle comprising two front wheels mounted thereto, the shaft comprising a slide rail formed on each of two opposite sides thereof,
      a slidable plate, which is fit over the shaft to be linearly movable along the shaft, the slidable plate comprising a first through hole formed therein, the first through hole being fit over the shaft, the slidable plate comprising a first pivotal joint section and a second pivotal joint section formed on each of two opposite side portions thereof, the slidable plate comprising a first driver device mounted thereon, and
      a rear wheel set, which comprises two second axles, each of the second axles having an end to which a rear wheel is mounted and an opposite end in which a third pivotal joint section is formed, the second axles being each pivotally connected to a first link and a second link, the first link having a free end in which a fourth pivotal joint section is formed, the second link having a free end in which a fifth pivotal joint section is formed, wherein the third pivotal joint sections of the second axles are respectively and pivotally connected to the first pivotal joint sections of the slidable plate and the fourth pivotal joint sections of the first links are respectively and pivotally connected to the second pivotal joint sections of the slidable plate so that the two second axles and the two first link of the rear wheel set are in operative and synchronously movable coupling with the slidable plate;
   a first frame, which is mounted on the chassis frame and has an end forming a first connection end and an opposite end forming a second connection end, the first connection end being coupled to the first driver device so that the first driver device selectively drives the first frame to rotate, the first frame comprising a third link pivotally connected thereto at a location adjacent to the first connection end, the third link having a free end to which a slide block is pivotally connected, the slide block comprising an engaging section, the slide block comprising a sixth pivotal joint section formed in each of two opposite side portions thereof, the engaging section being engageable with the slide rails of the shaft, the sixth pivotal joint sections being respectively and pivotally connected to the fifth pivotal joint sections of the second links so that the second links are in operative and synchronously movable coupling with the slide block; and
   a second frame, which is connected to the first frame and has an end forming a third connection end and an opposite end forming a fourth connection end, the third connection end being coupled to a second driver device, so that the second driver device selectively drives the second frame to rotate, the second driver device comprising a coupling section, the coupling section being coupled to the second connection end of the first frame so that the second frame and the first frame are connected to each other.

2. The foldable trolley according to claim 1, wherein the shaft of the front wheel set is further connected to a positioning bar, the slidable plate comprising a second through hole formed therein, the second through hole being fit over the positioning bar, the slide block comprising a third through hole formed therein, the third through hole being fit over the positioning bar.

3. The foldable trolley according to claim 1 further comprising a control device, the control device comprising at least one battery module, the control device being electrically connected to the first driver device and the second driver device to control the first driver device and the second driver device to rotate forward or backward.

4. The foldable trolley according to claim 1, wherein the first connection end of the first frame and the first driver device are provided with gears at coupling engagement therebetween, the first frame comprising a first latch mounted at the coupling engagement of the first connection end and the first driver device.

5. The foldable trolley according to claim 1, wherein the third connection end of the second frame and the second driver device are provided with gears at coupling engagement therebetween, the second frame comprising a second latch mounted at the coupling engagement of the third connection end and the second driver device.

6. The foldable trolley according to claim 1, wherein the second frame comprises a handlebar mounted to the fourth connection end.

* * * * *